US 9,691,157 B2

(12) United States Patent
Zhan et al.

(10) Patent No.: US 9,691,157 B2
(45) Date of Patent: Jun. 27, 2017

(54) VISUALIZATION OF ANATOMICAL LABELS

(71) Applicant: Siemens Medical Solutions USA, Inc., Malvern, PA (US)

(72) Inventors: Yiqiang Zhan, Berwyn, PA (US); Gerardo Hermosillo Valadez, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 49 days.

(21) Appl. No.: 14/851,027

(22) Filed: Sep. 11, 2015

(65) Prior Publication Data
US 2016/0078615 A1 Mar. 17, 2016

Related U.S. Application Data

(60) Provisional application No. 62/050,845, filed on Sep. 16, 2014.

(51) Int. Cl.
*G06K 9/00* (2006.01)
*G06T 15/00* (2011.01)
*G06T 7/10* (2017.01)
*G06T 7/11* (2017.01)
*G06T 7/00* (2017.01)

(52) U.S. Cl.
CPC .............. *G06T 7/11* (2017.01); *G06T 7/0012* (2013.01); *G06T 15/00* (2013.01); *G06T 2207/30012* (2013.01); *G06T 2219/004* (2013.01)

(58) Field of Classification Search
None
See application file for complete search history.

(56) References Cited

U.S. PATENT DOCUMENTS

| 9,454,813 | B2* | 9/2016 | Westerhoff | G06T 7/0081 |
| 2007/0110295 | A1* | 5/2007 | Shen | G06T 7/0012 |
| | | | | 382/131 |
| 2007/0127799 | A1* | 6/2007 | Reisman | G06T 7/73 |
| | | | | 382/128 |
| 2008/0117225 | A1* | 5/2008 | Wegenkittl | A61B 6/461 |
| | | | | 345/581 |
| 2008/0132784 | A1* | 6/2008 | Porat | G06T 7/0081 |
| | | | | 600/426 |
| 2011/0064291 | A1* | 3/2011 | Kelm | G06T 7/0087 |
| | | | | 382/131 |
| 2011/0225530 | A1* | 9/2011 | Osmundson | G06F 19/321 |
| | | | | 715/771 |
| 2011/0228995 | A1* | 9/2011 | Batman | G06T 19/00 |
| | | | | 382/128 |
| 2011/0311116 | A1* | 12/2011 | Benn | G06T 11/00 |
| | | | | 382/128 |

(Continued)

*Primary Examiner* — Matthew Bella
*Assistant Examiner* — Jose M Torres

(57) ABSTRACT

A framework for visualization is described herein. In accordance with one implementation, one or more structures of interest are localized in a three-dimensional image. A position of an anatomical label may be determined using a positioning technique that is selected according to a view type of a visualization plane through the image, wherein the position of the anatomical label is outside the one or more structures of interest. The anatomical label may then be displayed at the determined position in the visualization plane.

20 Claims, 10 Drawing Sheets

(56) References Cited

U.S. PATENT DOCUMENTS

| | | | |
|---|---|---|---|
| 2012/0172700 A1* | 7/2012 | Krishnan | A61B 6/032 600/407 |
| 2013/0279775 A1* | 10/2013 | Batman | G06T 19/00 382/128 |
| 2015/0173701 A1* | 6/2015 | Major | G06T 7/0081 382/131 |
| 2016/0089074 A1* | 3/2016 | Wang | A61B 5/4504 600/407 |
| 2016/0260231 A1* | 9/2016 | Klinder | G06T 15/08 |

* cited by examiner

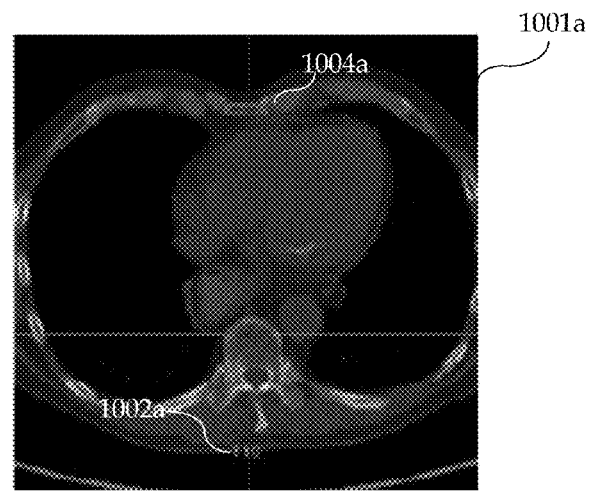
*Fig. 10a*
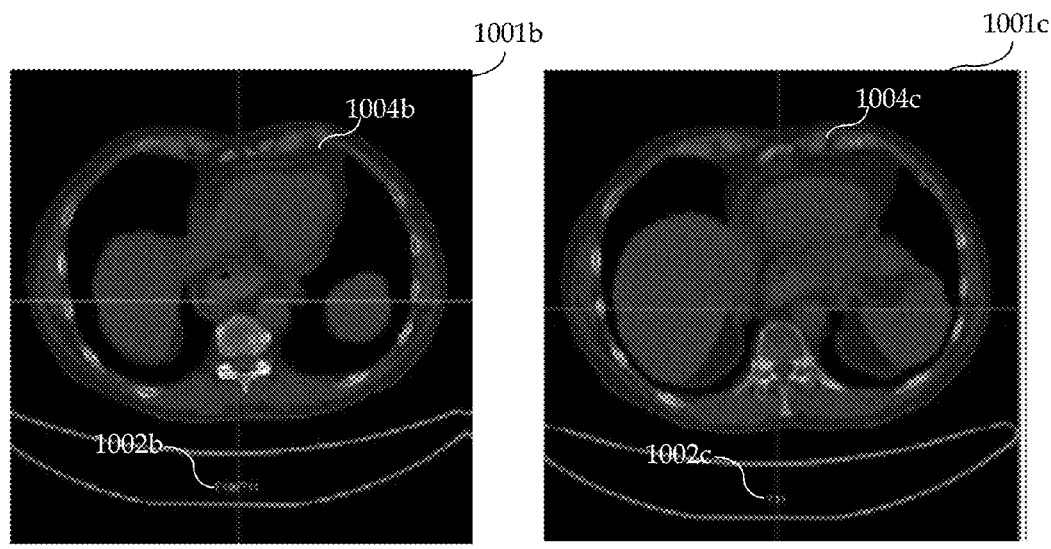
*Fig. 10b*  *Fig. 10c*

VISUALIZATION OF ANATOMICAL LABELS

CROSS-REFERENCE TO RELATED APPLICATION

The present application claims the benefit of U.S. provisional application No. 62/050,845 filed Sep. 16, 2014, the entire contents of which are herein incorporated by reference.

TECHNICAL FIELD

The present disclosure relates to visualization, and more particularly, to visualization of anatomical labels.

BACKGROUND

The field of medical imaging has seen significant advances since the time X-Rays were first used to determine anatomical abnormalities. Medical imaging hardware has progressed in the form of newer machines such as Magnetic Resonance Imaging (MRI) scanners, Computed Axial Tomography (CAT) scanners, etc. Because of the large amount of image data generated by such modern medical scanners, there has been and remains a need for developing image processing techniques that can automate some or all of the processes to determine the presence of anatomical abnormalities in scanned medical images.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor reaching an early diagnosis. Hence, there is a need for improving recognition techniques that provide accurate and fast recognition of anatomical structures and possible abnormalities in medical images.

One example of an anatomical structure that is often studied in medical images is the spine. Digital images of the spine may be reconstructed by using raw image data obtained from an MRI scanner. Such digital images are typically either a two-dimensional ("2-D") image made of pixel elements or a three-dimensional ("3-D") image made of volume elements ("voxels"). Three-dimensional images may be reconstructed by stacking individual slices one on top of the other. Multiplanar reconstruction (MPR) is a method of reconstruction that builds the image volume by stacking axial slices and cuts slices through the volume in a different MPR plane for visualization. By reformatting the volume, it becomes much easier to visualize the position of one vertebral body in relation to the others.

Vertebral bodies may be automatically labeled to facilitate more efficient interpretation of medical images. Although vertebrae labeling can provide useful information to radiologists, improper visualization or placement of vertebral labels may adversely affect image interpretation.

SUMMARY

Described herein is a framework for visualization. In accordance with one implementation, one or more structures of interest are localized in a three-dimensional image. A position of an anatomical label may be determined using a positioning technique that is selected according to a view type of a visualization plane through the image, wherein the position of the anatomical label is outside the one or more structures of interest. The anatomical label may then be displayed at the determined position in the visualization plane.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 10a-c show exemplary axial-dominated view type MPR images with different intersection zones.

DETAILED DESCRIPTION

Figure 1A:
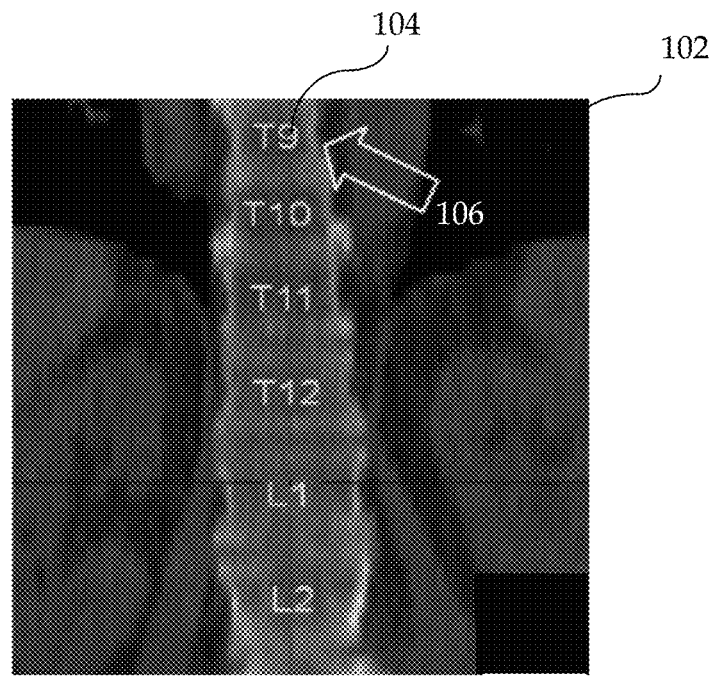
FIGS. 1a and 1b show exemplary images with improper placement of vertebral labels.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT (single-photon emission computed tomography), SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

The present framework relates to automated or semi-automated analysis of digital or digitized images. In accordance with one aspect, the present framework facilitates visualization of anatomical labels of structures of interest in three-dimensional images. An anatomical label is positioned near a structure of interest (e.g., vertebral body) and indicates the name or other textual information of the structure of interest. The anatomical labels are positioned with the awareness of the locations and extents of structure of interest. The anatomical labels neither occlude critical structures of interest (e.g., spine anatomies) nor provide ambiguous meaning of corresponding vertebrae. These advantageous features may be achieved by incorporating both localization and extents of structures of interest and standard patient coordinates (e.g., digital imaging and communications in medicine or DICOM patient coordinates) in determining the locations of the anatomical labels, as will be described in more details herein.

Figure 1B:
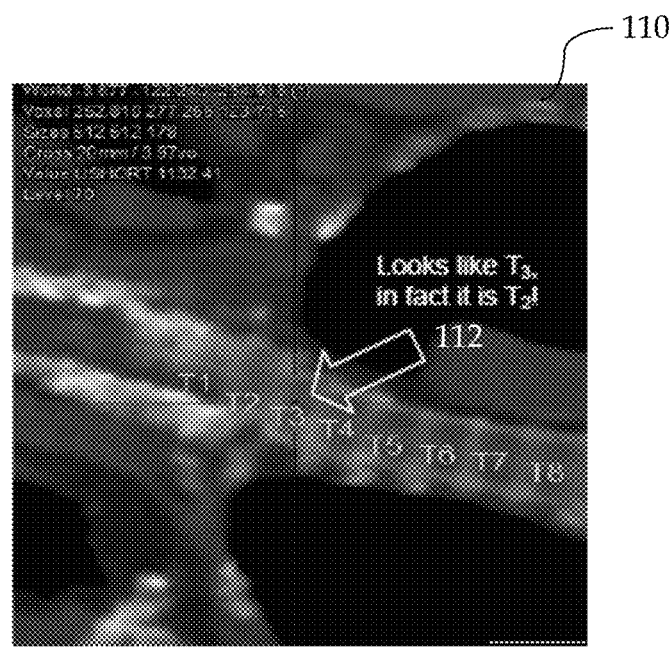

Previous automatic vertebral labeling techniques have resulted in ambiguous and confusing labels that adversely affects image interpretation. FIGS. 1a and 1b show two examples of improper placement of vertebral labels. FIG. 1a shows an exemplary image 102 with vertebral labels 104 (e.g., T9, T10, T11, T12, etc.) overlaid on vertebral bodies 106. Useful diagnostic information may thus be occluded by the labels 104. FIG. 1b shows another exemplary image 110 with vertebral label 112 that is ambiguous when the coronal view has in-plane rotation. If the vertebral labels are always displayed on the left side of the vertebral bodies, the labels may be ambiguous in a rotated MPR image. As shown, the label 112 looks like $T_3$, when in fact it should be $T_2$.

Figure 2:
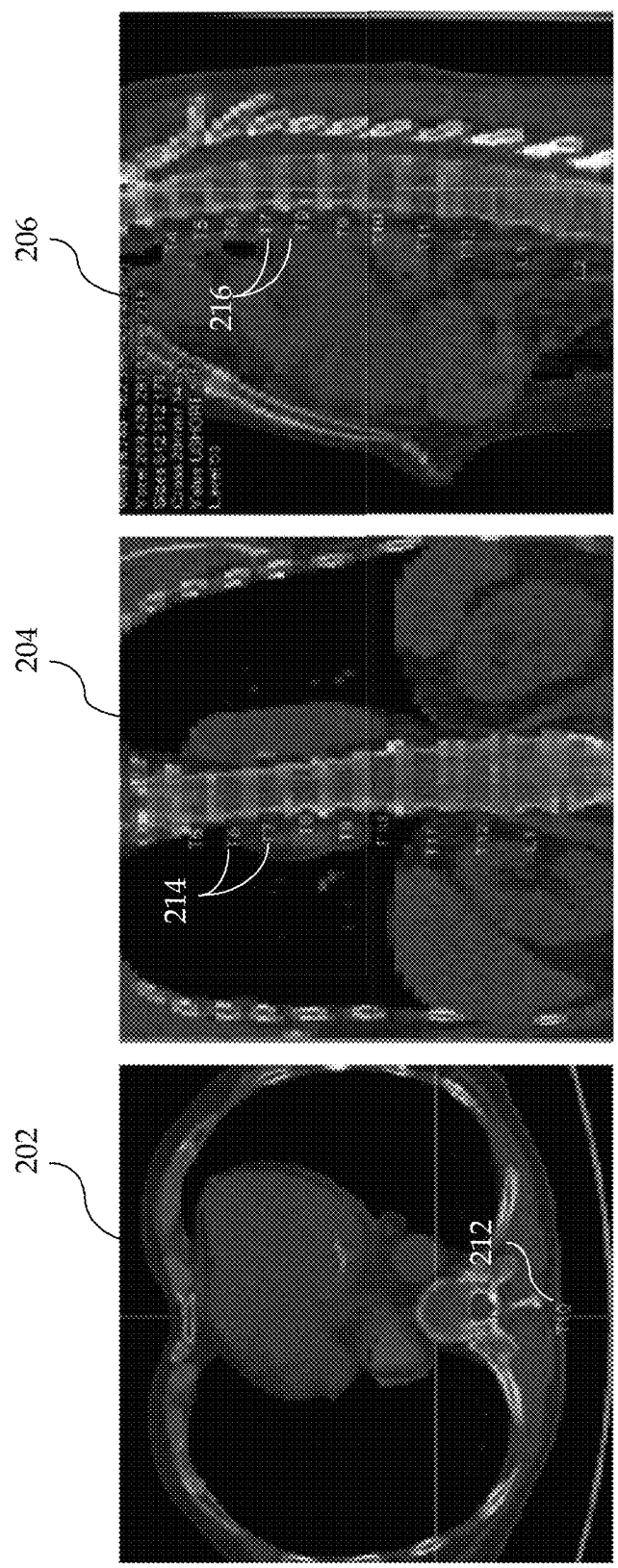
FIG. 2 shows exemplary label placement results generated by the present framework.

The present framework facilitates intelligent visualization of anatomical labels in three-dimensional images. FIG. 2 shows exemplary label placement results generated by the present framework. The vertebral labels (212, 214, 216) displayed in the images (202, 204, 206) do not occlude vertebral bodies, vertebral processes and spinal cords, even when the MPR planes are at arbitrary orientations. Different label positioning techniques may be used for different MPR planes with different orientations or view types. For example, in an axial-dominated MPR view 202, only one label 212 is displayed at a fixed position. In a coronal-dominated MPR view 204, labels 214 may be displayed at the patient's right side of the corresponding vertebrae. In a sagittal-dominated MPR view 206, labels 216 may be displayed at the patient's anterior side of the corresponding vertebrae. The label positioning technique may be automatically updated in response to the user rotating the MPR plane, thereby transitioning the dominant orientation of the MPR to a different mode (e.g., axial to sagittal views). These and other exemplary advantages and features will be described in more detail in the following description.

It should be understood that while a particular application directed to detecting and labeling vertebral bodies or spinal structures may be shown, the technology is not limited to the specific embodiments or applications illustrated. The present framework also has application to, for example, other types of anatomical structures of interest (e.g., ribs, aorta, smaller branches near the aorta, blood vessels, vascular system, airways, brain, colon, etc.) as well as abnormalities or diseases associated with such anatomical structures. Additionally, the present framework may be applied to image data acquired by one or more different imaging modalities, including but not limited to, magnetic resonance (MR) imaging, computed tomography (CT), helical CT, X-ray, positron emission tomography (PET), PET-CT, fluoroscopy, ultrasound, single-photon emission computed tomography (SPECT), SPECT-CT, MR-PET, etc.

Figure 3:
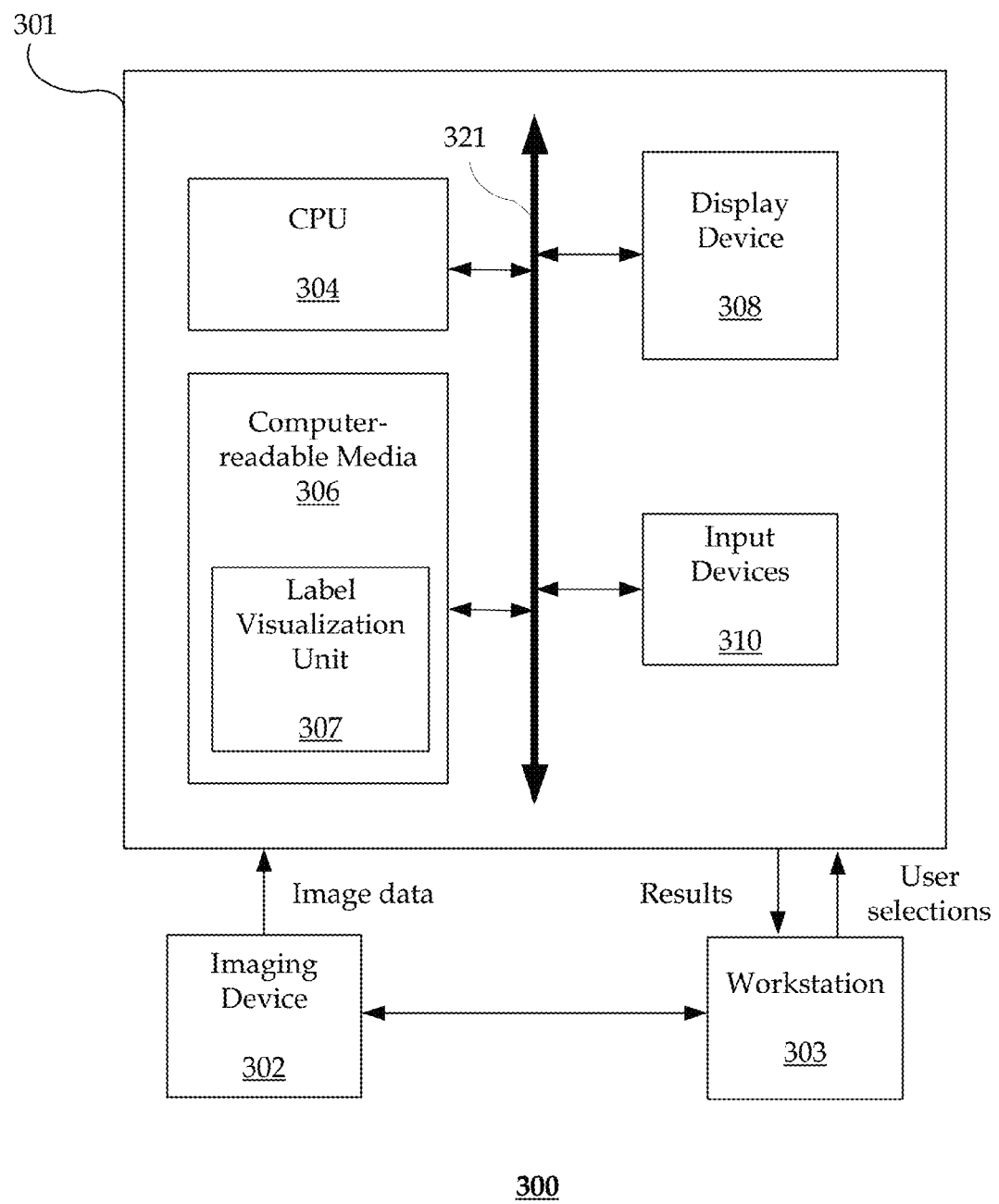
FIG. 3 is a block diagram illustrating an exemplary system.

FIG. 3 is a block diagram illustrating an exemplary system 300. The system 300 includes a computer system 301 for implementing the framework as described herein. Computer system 301 may be a desktop personal computer, a portable laptop computer, another portable device, a mini-computer, a mainframe computer, a server, a storage system, a dedicated digital appliance, a communication device, or another device having a storage sub-system configured to store a collection of digital data items. In some implementations, computer system 301 operates as a standalone device. In other implementations, computer system 301 may be connected (e.g., using a network) to other machines, such as imaging device 302 and workstation 303. In a networked deployment, computer system 301 may operate in the capacity of a server (e.g., thin-client server, such as Syngo®.via by Siemens Healthcare), a client user machine in server-client user network environment, or as a peer machine in a peer-to-peer (or distributed) network environment.

In one implementation, computer system 301 comprises a processor or central processing unit (CPU) 304 coupled to one or more non-transitory computer-readable media 306 (e.g., computer storage or memory), display device 308 (e.g., monitor) and various input devices 310 (e.g., mouse or keyboard) via an input-output interface 321. Computer system 301 may further include support circuits such as a cache, power supply, clock circuits and a communications bus. Various other peripheral devices, such as additional data storage devices and printing devices, may also be connected to the computer system 301.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 306. In particular, the present techniques may be implemented by label visualization unit 307. Non-transitory computer-readable media 306 may include random access memory (RAM), read only memory (ROM), magnetic floppy disk, flash memory, and other types of memories, or a combination thereof. The computer-readable program code is executed by CPU 304 to process image data (e.g., MR or CT images) acquired by, for example, imaging device 302 (e.g., MR or CT scanner). As such, the computer system 301 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 306 may also be used for image datasets, visualization instructions, knowledge base, individual patient data, and so forth. Such data may also be stored in external storage or other memories. The external storage may be implemented using a database management system (DBMS) managed by the CPU 304 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 302 may be a radiology scanner, such as a magnetic resonance (MR) scanner or a CT scanner, for acquiring images or image data. The workstation 303 may include a computer and appropriate peripherals, such as a keyboard and display device, and can be operated in conjunction with the entire system 300. For example, the workstation 303 may communicate with the imaging device 302 so that the image data acquired by the imaging device 302 can be reconstructed, processed, rendered at the workstation 303 and/or viewed on a display device 308.

The workstation 303 may communicate directly with the computer system 301 to display processed image data and/or output image processing results (e.g., labeled images). The workstation 303 may include a graphical user interface to receive user input via an input device (e.g., keyboard, mouse, touch screen voice or video recognition interface, etc.) to manipulate visualization and/or processing of the image data. For example, the user may view the presented image data, and specify one or more visualization plane adjustments or preferences (e.g., zooming, panning, rotating, changing contrast, changing color, changing view angle, changing view depth, changing rendering or reconstruction technique, etc.), navigate to a particular region of interest by specifying a "goto" location, and so forth.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Figure 4:
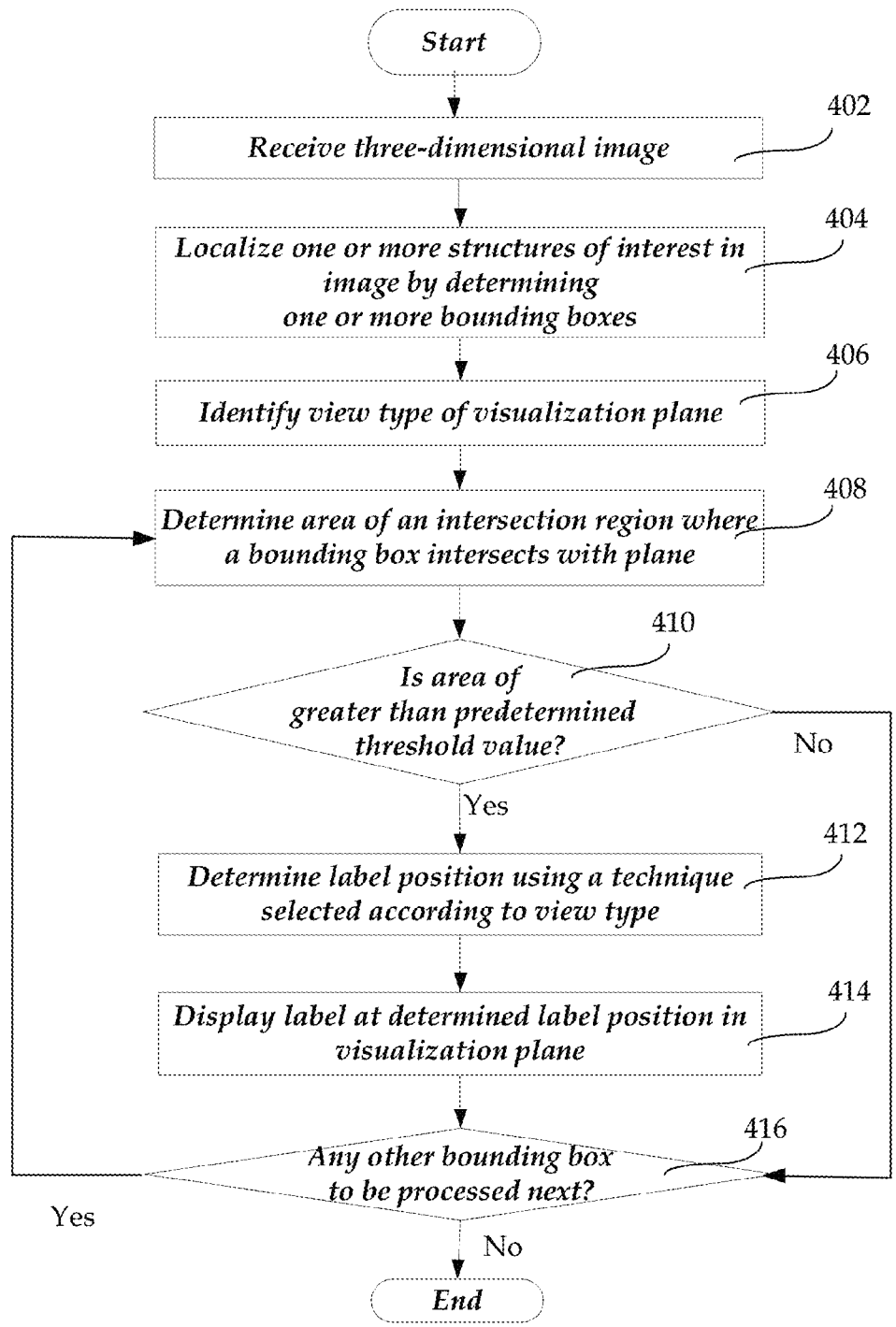
FIG. 4 shows an exemplary method for facilitating visualization.

FIG. 4 shows an exemplary method 400 for facilitating visualization of anatomical labels. It should be understood that the steps of the method 400 may be performed in the order shown or a different order. Additional, different, or fewer steps may be provided. Further, the method 400 may be implemented with the system 300 of FIG. 3, a different system, or a combination thereof.

At 402, label visualization unit 307 receives a three-dimensional image. The three-dimensional image may be reconstructed from medical image data (e.g., MR, CT, PET, etc.) of a patient acquired by, for example, imaging device 302. In some implementations, a multiplanar reconstruction (MPR) technique is used to reconstruct the three-dimensional image from axial slices. Other types of reconstruction techniques are also useful. In some implementations, the three-dimensional image is stored in a DICOM file format. Other types of file formats are also useful.

At 404, label visualization unit 307 localizes one or more structures of interest in the image. A structure of interest is any anatomical structure identified for further study, such as a vertebral body (or vertebra). The localization may be performed by determining one or more bounding boxes. A bounding box may be a structure bounding box enclosing the structure of interest or a transition bounding box enclosing a transition zone between structures of interest. A structure bounding box is a three-dimensional box with the smallest volume within which all points of the structure of interest lie. A transition bounding box is a three-dimensional box with the smallest volume within which all points of the transition zone lie. The transition zone may include the gap between structure bounding boxes of two neighboring structures of interest. In some implementations, the transition zone further includes the top and lower portions (e.g., one third portion) of the two neighboring structures of interest. Each structure of interest (e.g., vertebral body) in the 3D image may be localized to generate two sets of bounding boxes: $\{B_i\}$ (structure bounding boxes) and $\{T_j\}$ (transition bounding boxes).

Figure 5:
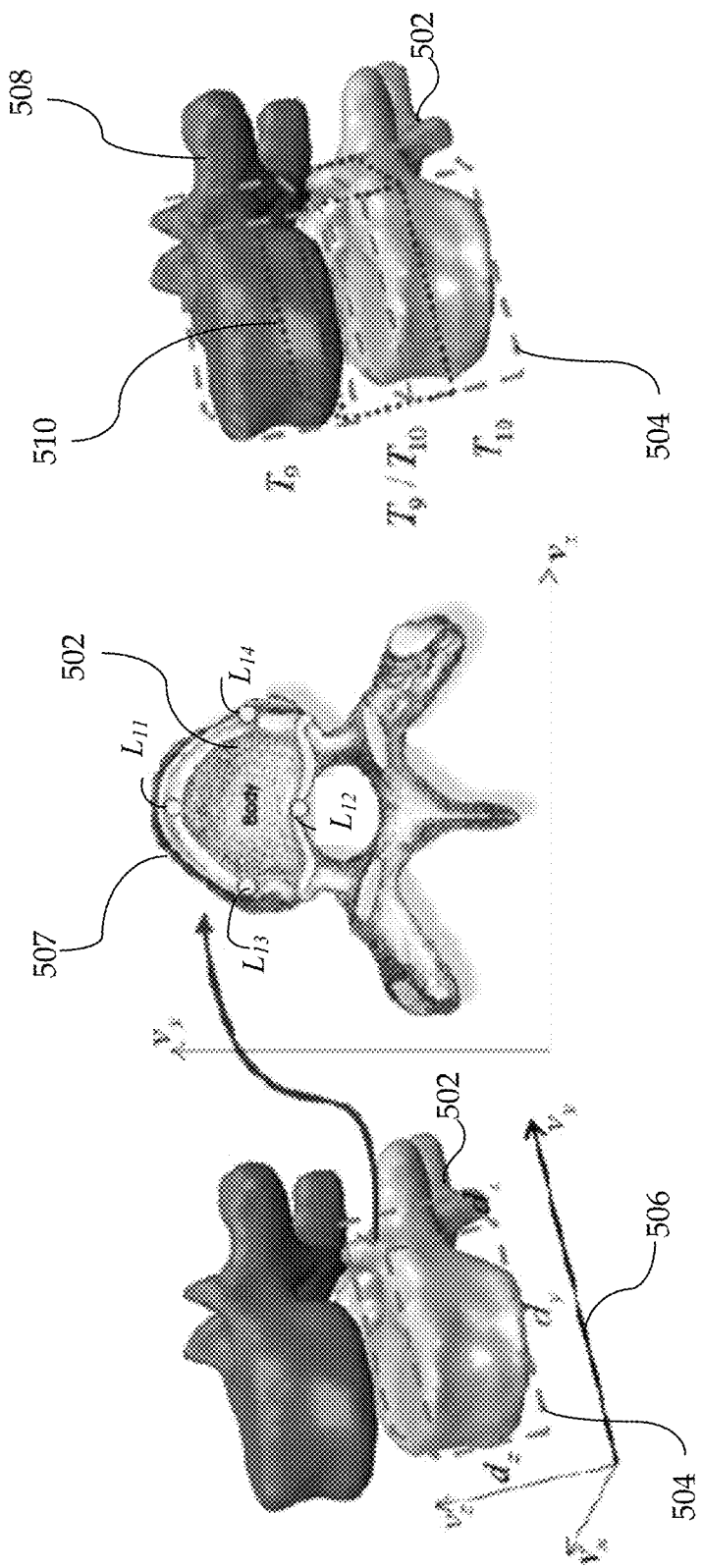
FIGS. 5(a)-(c) show exemplary bounding boxes.

FIGS. 5(a)-(c) show exemplary bounding boxes. More particularly, FIG. 5(a) shows a structure bounding box 504 around vertebral body 502. FIG. 5(b) shows a transverse view of the upper boundary of the vertebral body 502. FIG. 5(c) shows the transition bounding box enclosing the transition zone between vertebral bodies 502 and 508.

To determine the structure bounding box, label visualization unit 307 may first detect landmarks located at the upper and lower boundaries of the structure of interest. For example, in FIG. 5b, 4 landmarks ($L_{11}$, $L_{12}$, $L_{13}$ and $L_{14}$) are detected at the upper boundary 507 of the vertebral body 502. Another 4 landmarks ($L_{21}$, $L_{22}$, $L_{23}$ and $L_{24}$) (not shown) may be detected at the lower boundary of the vertebral body 502.

The orientation of the vertebral body 502 is provided by a local patient frame 506. The local patient frame 506 is defined by three orthogonal direction vectors $v_x$, $v_y$, and $v_z$. The local patient frame 506 does not depend on the orientation of the visualization (or MPR) plane, but is based on the location of the associated anatomical structure in the patient. For example, the 3D vector $v_x$ always points from the patient's right to left side of the specific vertebral body 502; the 3D vector $v_y$ always points from the patient's anterior to posterior side of the specific vertebral body 502; and the 3D vector $v_z$ always points from the patient's bottom to top side of the specific vertebral body 502. Each vertebral body 502 may be associated with an individual local patient frame 506. The properties (c, $d_x$, $d_y$, $d_z$) of the structure bounding box 504 may then be defined based on these landmarks and the orientation provided by the local patient frame 506, wherein c denotes the 3D position vector of the center point of the bounding box, and ($d_x$, $d_y$, $d_z$) denote the extents (i.e., depth, width, height) of the bounding box.

Similarly, the properties of a transition bounding box may also be determined. Referring to FIG. 5c, the transition bounding box 510 may be defined between neighboring structures of interest (502 and 508). In some implementations, the transition bounding box 510 covers the gap between the structure bounding boxes of neighboring structures of interest (502 and 508), as well as the top and lower portion (e.g., one-third) of the neighboring vertebrae. Each transition bounding box 510 may be associated with an individual local patient frame. Referring to FIG. 5c, the local patient frame of the transition bounding box 510 may be derived based on the local patient frames associated with its neighboring structures of interest (502 and 508). The properties (c, $d_x$, $d_y$, $d_z$) of the transition bounding box 504 may then be determined, wherein c denotes the 3D position vector of the center point of the bounding box, and ($d_x$, $d_y$, $d_z$) denote the extents (i.e., depth, width, height) of the bounding box.

Referring back to FIG. 4, at 406, label visualization unit 307 identifies the view type of the visualization plane. The visualization plane determines what pixels of the image are currently rendered and displayed at a display device. In some implementations, the visualization plane is an MPR plane that cuts through the image volume. The orientation and/or position of the visualization plane may be predetermined or selected by the user via, for example, workstation 303, to display the desired structures of interest and/or associated transition zones.

Label visualization unit 307 may identify the view type of the visualization plane as axial-dominated, coronal-dominated or sagittal-dominated, so as to properly display anatomical labels in a visualization plane with arbitrary orientation. The view type may be identified based on the following rules: (1) axial-dominated: if $N_{MPR} \cdot Z$=max ($N_{MPR} \cdot X$, $N_{MPR} \cdot Y$, $N_{MPR} \cdot Z$); (2) coronal-dominated: if $N_{MPR} \cdot Y$=max ($N_{MPR} \cdot X$, $N_{MPR} \cdot Y$, $N_{MPR} \cdot Z$); and (3) sagittal-dominated: if $N_{MPR} \cdot X$=max ($N_{MPR} \cdot X$, $N_{MPR} \cdot Y$, $N_{MPR} \cdot Z$), wherein $N_{MPR}$ denotes the normal vector of the MPR visualization plane and $N_{MPR} \cdot X$, $N_{MPR} \cdot Y$ and $N_{MPR} \cdot Z$ are the X, Y and Z components of the normal vector.

Figure 6:
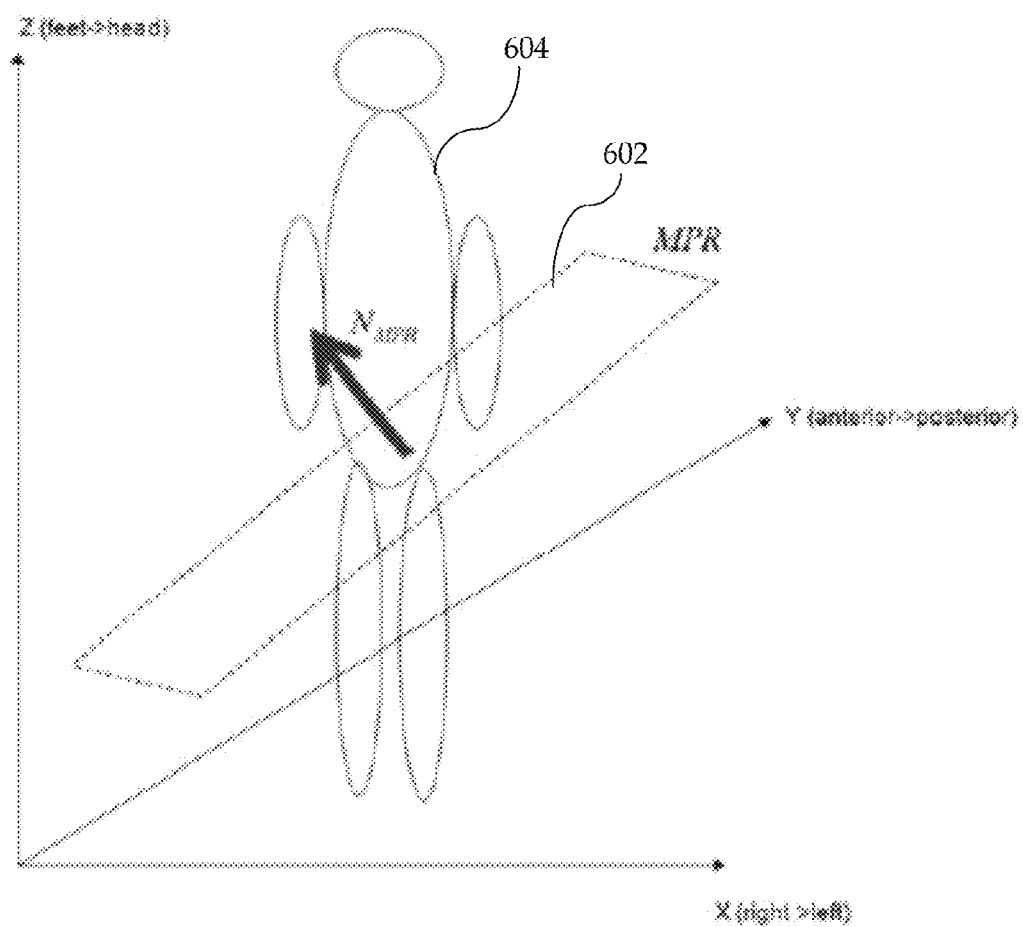
FIG. 6 illustrates an exemplary view type identification.

FIG. 6 illustrates an exemplary view type identification. The dashed parallelogram 602 denotes the MPR visualization plane, and the arrow indicates the normal vector $N_{MPR}$ of the MPR plane. The X, Y and Z components of the normal vector $N_{MPR}$ may be defined with reference to the patient coordinate system provided by, for example, the DICOM header information of the image. In some implementations, the patient coordinate system is defined such that the X-axis is increasing from the right to the left side of the patient 604, the Y-axis is increasing from the anterior to the posterior side of the patient 604, and the Z-axis is increasing from the feet toward the head of the patient 604.

Referring back to FIG. 4, at 408, label visualization unit 307 determines the area of an intersection region for each bounding box. The intersection region refers to the portion on the visualization plane where the bounding box intersects with the visualization plane. The intersection region may be determined by calculating the intersection point between each edge of the bounding box and the visualization plane. The intersection points may be sorted to form a convex hull to represent the intersection region. The intersection points may be sorted in, for example, a clockwise or anticlockwise order around a center point so as to form the convex hull.

Figure 7:
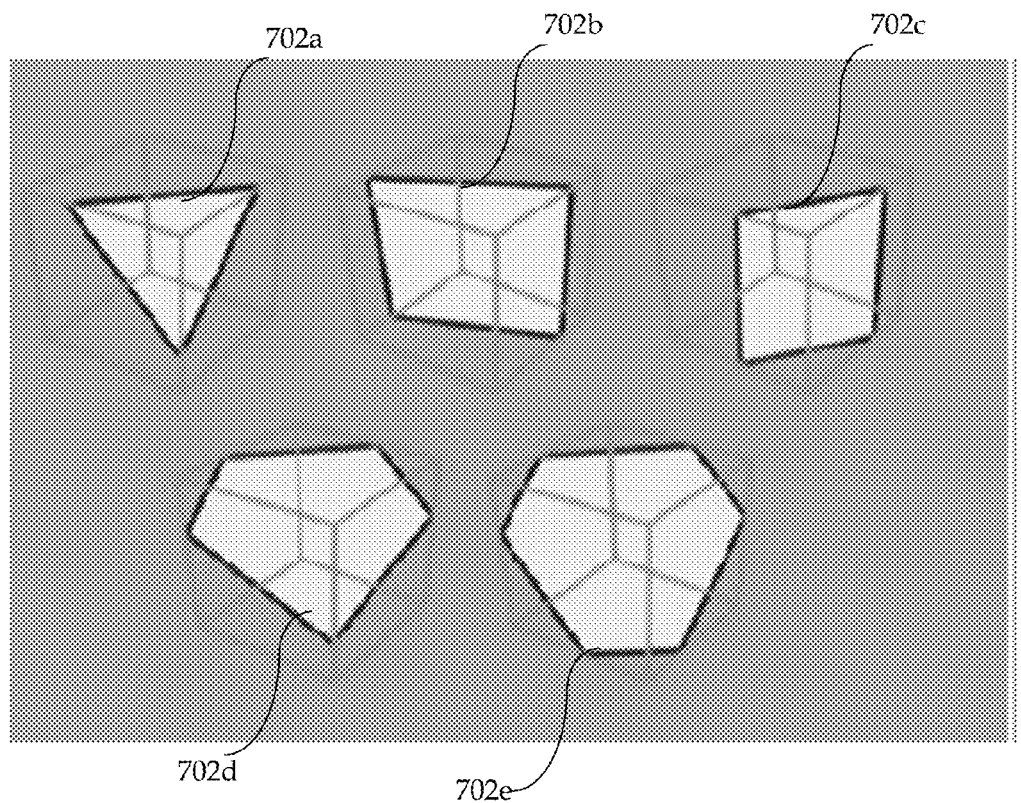
FIG. 7 shows different exemplary shapes of the intersection region.

FIG. 7 shows different exemplary shapes 702a-e of the intersection region that may be derived. The possible shapes of the intersection region include a point, a line, a triangle 702a, a square 702c, other quadrilateral shape 702b, a pentagon 702d, a hexagon 702e, or any other type of polygon. The area of the intersection region may then be calculated.

Referring back to FIG. 4, at 410, label visualization unit 307 determines if the area of the intersection region is greater than a predetermined threshold value. Only the labels of those structures of interest with the intersection regions larger than the threshold value may be displayed. If the area of the intersection region is greater than the predetermined threshold value, the method 400 continues to the next step 412. If not, the method 400 continues to step 416.

At 412, label visualization unit 307 determines the position of the label using a positioning technique selected according to the view type of the visualization plane. The position of the label is outside the localized structures of interest so as to avoid obscuring clinically significant information. When the visualization plane is rotated to another different view type (e.g., axial to sagittal), the label positioning technique may be automatically updated. For each structure of interest whose label is to be shown, the corresponding 3D position vector of the center point and extents (c, $d_x$, $d_y$, $d_z$) of the bounding box as well as its associated local patient frame ($v_x$, $v_y$, $v_z$) may first be projected to the visualization plane as projected bounding box center point and extents (c', $d'_x$, $d'_y$, $d'_z$) and projected local patient frame ($v'_x$, $v'_y$, $v'_z$). Next, the position of the label may then be calculated using a technique that is selected according to the view type of the visualization plane.

In some implementations, if the MPR view type is coronal-dominated, the following Equation (1) is used to calculate the label position. If the MPR view type is sagittal-dominated, the label position is calculated using Equation (2).

$$l=c'-\mu d'_x {}^* v'_x \qquad (1)$$

$$l=c'-\mu d'_y {}^* v'_y \qquad (2)$$

wherein l is the 2D position vector of the label on the MPR plane, c' is a 2D position vector of the projected bounding box center point, μ is an adjustable scalar coefficient, $v'_x$ and $v'_y$ are 2D local patient frame vectors of the projected local patient frame, and $d'_x$ and $d'_y$ are the projected depth and width respectively.

At 414, the labels are displayed at the determined label positions in the visualization plane. In some implementations, the label of the structure of interest is displayed with a font size that is proportional to the resolution or zoom ratio of the current visualization plane. The distance between the label and the structure of interest may also be adapted based on the resolution or zoom ratio. At 416, label visualization unit 307 determines whether there is any other bounding box to be processed next. If yes, the method 400 returns to 408. If no, the method 400 ends.

Figure 8A:
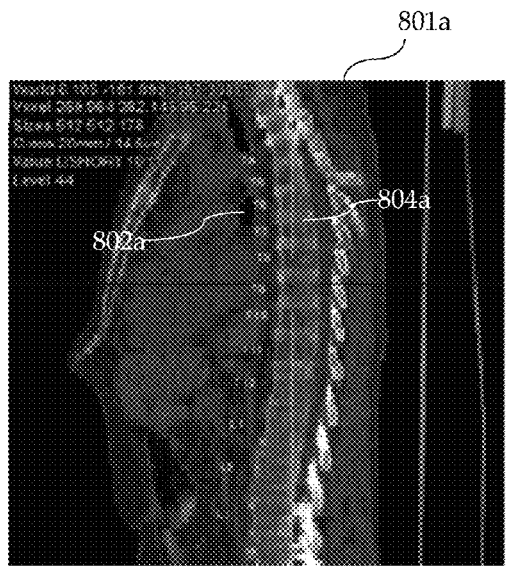
FIGS. 8a, 8b and 8c show exemplary sagittal-dominated view type MPR images with different MPR plane orientations.
Figure 8B:
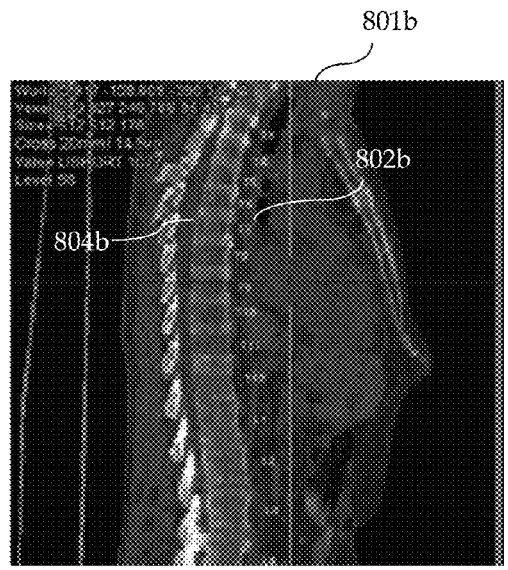
Figure 8C:
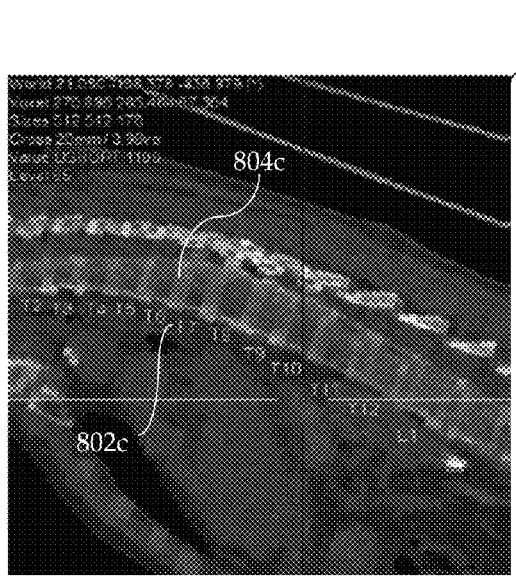

FIGS. 8a, 8b and 8c show exemplary sagittal-dominated view type MPR images 801a-c with different MPR plane orientations. The vertebral labels 802a-c (e.g., T4, T5, T6, etc.) are located at a fixed side of the spine (or vertebral bodies) 804a-c with respect to the patient coordinate system. More particularly, the vertebral labels 802a-c are displayed at the patient's anterior side of the corresponding vertebral bodies 804a-c. Even after the MPR plane is rotated completely to the opposite side (from face right to face left), as shown in FIG. 8b, the vertebral labels 802b always appear at the patient's anterior side of the spine 804c. In this way, the labels may advantageously avoid obscuring diagnostically significant anatomical regions, such as the spinal cord. FIG. 8c shows the image 801c generated by an MPR plan that is rotated to an arbitrary orientation. The displayed vertebral labels 802c unambiguously name the associated vertebral bodies 804c even in such orientation.

Figure 9A:
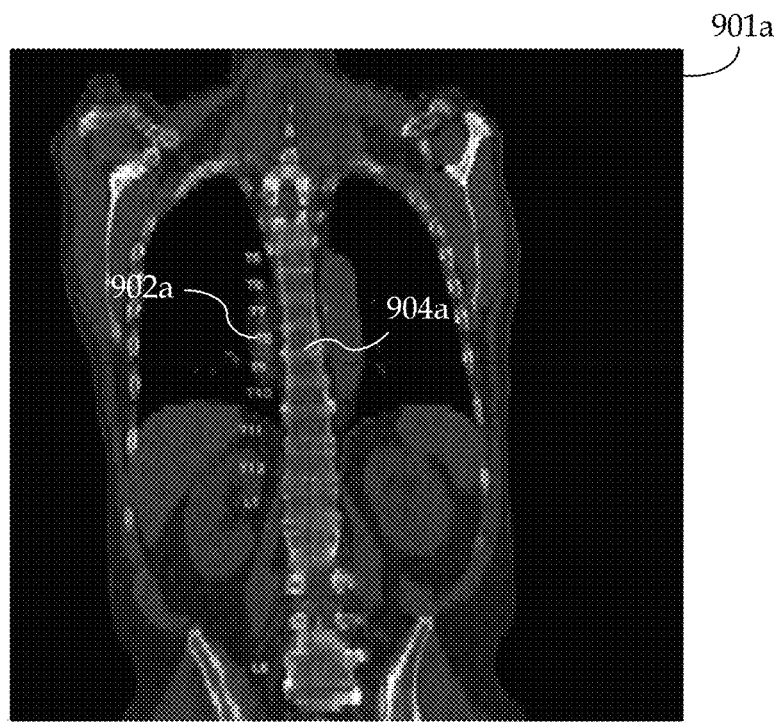
FIGS. 9a and 9b show exemplary coronal-dominated view type MPR images with different zoom ratios.
Figure 9B:
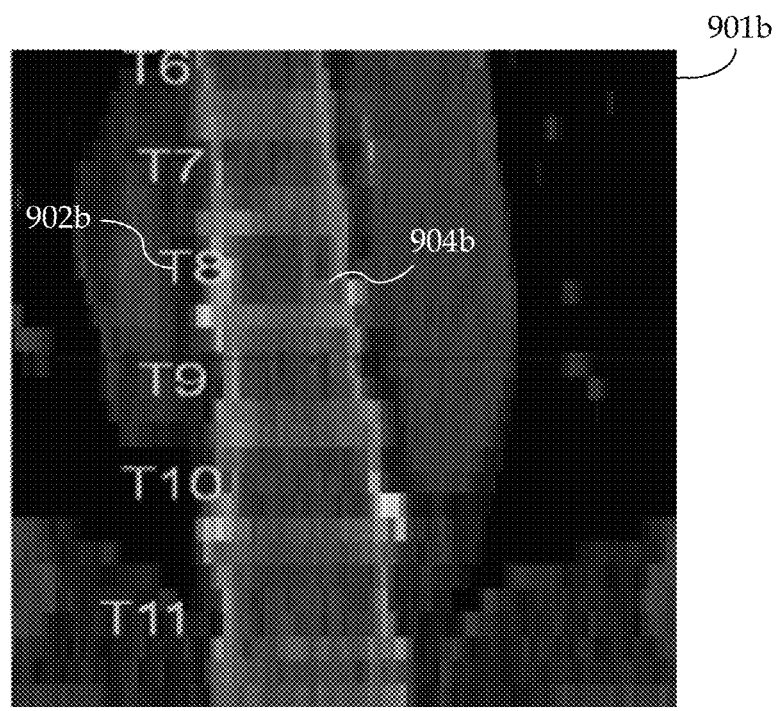

FIGS. 9a and 9b show exemplary coronal-dominated view type MPR images 901a-b with different zoom ratios (or magnifications). The labels 902a-b are displayed at the patient's right side of the corresponding vertebral bodies 904a-b. In addition, the font sizes of the displayed labels 902a-b and the distance between the labels and their corresponding vertebral bodies 904a-b are adapted based on the zoom ratio or resolution of the MPR planes. For example, the font size is larger and the distance between each label 902b and its corresponding vertebral body 904b is smaller in image 901b with a higher zoom ratio (as shown in FIG. 9b) than in image 901a with a lower zoom ratio (as shown in FIG. 9a).

If the MPR view type is axial-dominated, only one single label is displayed. Steps 408 and 410 may be performed to process each transition bounding box of the set $\{T_j\}$. If there is more than one transition bounding box eligible for display (according to the criterion in step 410), the label associated with the transition bounding box with the largest intersection region is selected for display. If there is no transition bounding box eligible to display, then for each structure bounding box in the set $\{B_j\}$, steps 408 and 410 are repeated.

If there is more than one structure bounding box eligible for display (according to the criterion in step 410), the label associated with the structure bounding box with the largest intersection region is selected for display. The selected label is displayed at a fixed location of the axial-dominated MPR plane.

FIGS. 10a-c show exemplary axial-dominated view type MPR images 1001a-c with different intersection zones. Only one label 1002a-c is displayed at the corresponding vertable in each image 1001a-c so as to avoid confusion. The label 1002a-c in each image 1001a-c is displayed at a fixed position. Such position is predetermined and fixed with respect to the patient coordinate system of the MPR plane. When the MPR plane intersects with transition zones between neighboring vertebral bodies, such as shown in FIG. 10b, the label 1002b is updated accordingly (e.g., T10/T11).

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A system for visualization, comprising:
a non-transitory memory device for storing computer readable program code;
a processor in communication with the memory device, the processor being operative with the computer readable program code to perform steps including:
receiving a three-dimensional image,
localizing at least one structure of interest in the image by determining at least one bounding box,
identifying a view type of a visualization plane through the image as axial-dominated, coronal-dominated or sagittal-dominated,
determining an area of an intersection region where the bounding box intersects with the visualization plane by calculating intersection points between each edge of the bounding box and the visualization plane and sorting the intersection points to form a convex hull that represents the intersection region,
in response to the area of the intersection region being greater than a predetermined threshold value, determining a position of an anatomical label using a positioning technique selected according to the view type of the visualization plane, wherein the position of the anatomical label is outside the structure of interest, and
displaying the anatomical label at the determined position in the visualization plane.

2. The system of claim 1 wherein the processor is operative with the computer readable program code to localize the structure of interest by determining a structure bounding box enclosing the structure of interest.

3. The system of claim 1 wherein the processor is operative with the computer readable program code to localize the structure of interest by determining the bounding box enclosing a transition zone between neighboring structures of interest.

4. The system of claim 1 wherein the processor is operative with the computer readable program code to determine the position of the anatomical label based on a center point and extents of the bounding box in response to the view type being determined as coronal-dominated or sagittal-dominated.

5. A method of visualization, comprising:
receiving, by a processor device, a three-dimensional image;
localizing, by the processor device, one or more structures of interest in the image by determining one or more bounding boxes;
identifying, by the processor device, a view type of a visualization plane through the image;
determining, by the processor device, a position of an anatomical label using a positioning technique selected according to the view type of the visualization plane, wherein the position of the anatomical label is outside the one or more structures of interest, wherein the position is determined based on a center point and extents of at least one of the one or more bounding boxes in response to the view type being determined as coronal-dominated or sagittal-dominated; and
displaying, via a display device, the anatomical label at the determined position in the visualization plane.

6. The method of claim 5 wherein localizing the one or more structures of interest comprises localizing one or more vertebral bodies in the image.

7. The method of claim 5 wherein determining the one or more bounding boxes comprises determining a structure bounding box enclosing at least one of the one or more structures of interest.

8. The method of claim 5 wherein determining the one or more bounding boxes comprises determining a transition bounding box enclosing a transition zone between the structures of interest neighboring each other.

9. The method of claim 5 wherein determining the one or more bounding boxes comprises determining an individual local patient frame for each of the one or more bounding boxes.

10. The method of claim 5 wherein identifying the view type of the visualization plane comprises identifying the view types as axial-dominated, coronal-dominated or sagittal-dominated.

11. The method of claim 5 further comprises determining an area of an intersection region where at least one of the one or more bounding boxes intersects with the visualization plane.

12. The method of claim 11 further comprises determining the intersection region by calculating intersection points between each edge of the bounding box and the visualization plane and sorting the intersection points to form a convex hull that represents the intersection region.

13. The method of claim 11 wherein determining the position of the anatomical label is performed in response to the area of the intersection region being greater than a predetermined threshold value.

14. The method of claim 5 further comprises automatically updating the positioning technique in response to rotation of the visualization plane to a different view type.

15. The method of claim 5 wherein determining the position of the anatomical label comprises determining the position that is located at a patient's anterior side of a corresponding structure of interest in response to the view type being determined as sagittal-dominated.

16. The method of claim 5 wherein determining the position of the anatomical label comprises determining the position that is located at a patient's right side of a corresponding structure of interest in response to the view type being determined as coronal-dominated.

17. The method of claim 5 wherein determining the position of the anatomical label comprises determining the position of a single anatomical label in response to the view type being determined as axial-dominated.

18. The method of claim 5 further comprises determining a font size of the label, wherein the font size is proportional to a resolution of the visualization plane.

19. The method of claim 5 further comprises determining a distance of the label from a corresponding structure of interest, wherein the distance is proportional to a resolution of the visualization plane.

20. A non-transitory computer readable medium embodying a program of instructions executable by machine to perform steps for visualization, the steps comprising:
receiving a three-dimensional image;
localizing one or more structures of interest in the image by determining one or more bounding boxes;
determining a position of an anatomical label using a positioning technique selected according to a view type of a visualization plane through the image, wherein the position of the anatomical label is outside the one or more structures of interest, wherein the position is determined based on a center point and extents of at least one of the one or more bounding boxes in response to the view type being determined as coronal-dominated or sagittal-dominated; and
displaying the anatomical label at the determined position in the visualization plane.

* * * * *